United States Patent
Yamamoto (10) Patent No.: US 7,688,799 B2
(45) Date of Patent: Mar. 30, 2010

(54) MOBILE TERMINAL, WIRELESS RELAY APPARATUS, AND MOBILE COMMUNICATION SYSTEM

(75) Inventor: Katsuya Yamamoto, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 626 days.

(21) Appl. No.: 10/928,495

(22) Filed: Aug. 27, 2004

(65) Prior Publication Data

US 2005/0083873 A1 Apr. 21, 2005

(30) Foreign Application Priority Data

Aug. 29, 2003 (JP) ............................. 2003-305669

(51) Int. Cl.
*H04J 3/00* (2006.01)

(52) U.S. Cl. ...................... 370/345; 370/328; 370/202; 370/521; 370/468; 370/477; 455/67.1; 455/72; 375/337; 375/347; 379/88.1; 379/93.8; 709/246; 709/247

(58) Field of Classification Search ................. 370/345, 370/328, 202, 521, 468, 477, 28; 375/337, 375/347; 455/67.11, 72; 379/88.1, 93.08; 709/246, 247

See application file for complete search history.

(56) References Cited

U.S. PATENT DOCUMENTS

| 6,868,075 B1* | 3/2005 | Narvinger et al. | 370/335 |
| 6,975,608 B1* | 12/2005 | Park et al. | 370/332 |
| 2003/0031143 A1* | 2/2003 | Faerber | 370/331 |
| 2005/0083873 A1* | 4/2005 | Yamamoto | 370/328 |
| 2005/0286468 A1* | 12/2005 | Agin et al. | 370/331 |

* cited by examiner

Primary Examiner—Rafael Pérez-Gutiérrez
Assistant Examiner—Nimesh Patel
(74) Attorney, Agent, or Firm—Frommer Lawrence & Haug LLP; William S. Frommer; Paul A. Levy (57) ABSTRACT

In a case of being judged that a compressed mode is applied in a mobile terminal, if it is judged that reception quality during data communication is favorable, gap intervals are not created by passing through a processing of gap interval creation. Further, if the data communication over the HS-DSCH is performed, the data communication over the HS-DSCH is continued. This prevents degradation of data transmission rate over a channel for high speed data transmission service, in the presence of a mobile terminal in a favorable reception quality area.

7 Claims, 8 Drawing Sheets

MOBILE TERMINAL, WIRELESS RELAY APPARATUS, AND MOBILE COMMUNICATION SYSTEM

CROSS REFERENCES TO RELATED APPLICATIONS

The present document is based on Japanese Priority Document JP 2003-305669, filed in the Japanese Patent Office on Aug. 29, 2003, the entire contents of which being incorporated herein by reference.

BACKGROUND OF THE INVENTION

1. Field of the Invention

The present invention relates to a mobile terminal, a wireless relay apparatus, and a mobile communication system, which are suitable in causing a large amount of data to efficiently transmit to, for example, a mobile terminal in a mobile communication system.

2. Description of Related Art

In a mobile communication system, it is important to satisfy the following two different functional requirements: that a mobile terminal (hereinafter suitably referred to as a "mobile station") is able to efficiently receive data from a base station currently in communication; and that a mobile station switches base stations to maintain data transmission (hereinafter referred to as "handover"). Especially, to implement the handover, it becomes necessary that a mobile station always monitors neighboring base stations.

Figure 1:
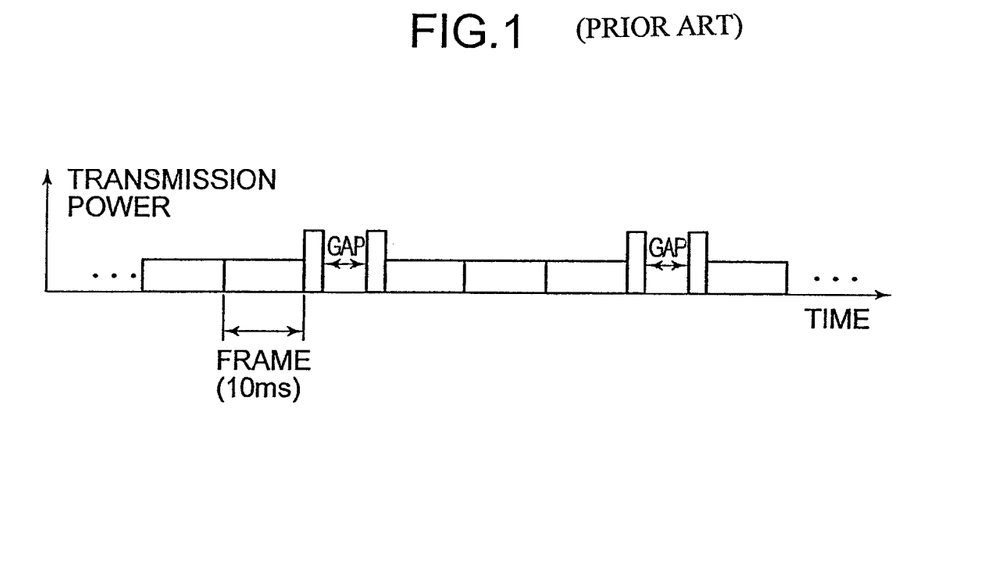
FIG. 1 is a diagram used for explanation of a receiving situation of a mobile station to which a compressed mode is applied.

For example, in Wideband-Code Division Multiple Access (W-CDMA) system that is specified by 3rd generation partnership project (3GPP), as a third generation mobile phone service, a compressed mode is specified as a function for performing monitoring (measurement) of different frequency base stations when performing handover between different frequencies. Specifically, according to the compressed mode, a base station sets gap intervals as shown in FIG. 1, and stops data sending over a dedicated channel (hereinafter referred to as a "dedicated CH") in the gap intervals, whereas a mobile station switches frequencies by utilizing the time within the gap intervals, and monitors different frequency base stations. Here, the dedicated CH is a transmission channel used for implementing mainly voice transmission and data transmission at a relatively low speed.

The base station end (actually, universal terrestrial radio access network (UTRAN)) makes the determination of the transition to the above-mentioned compressed mode. At that time, the base station end notifies a mobile station of necessary parameters for setting gap intervals at the mobile station in applying the compressed mode.

FIG. 1 shows receiving situation at a mobile station to which this compressed mode is applied. The ordinate of FIG. 1 indicates transmission power, and the abscissa indicates frame transmission time. In W-CDMA communication system, there is specified that transmission rate can be increased temporarily by changing spreading factor, for example. Therefore, the mobile station increases temporarily transmission rate by changing spreading factor, whereas a wireless frame performs processing so as to maintain the same time length as that before changing the spreading factor, thereby creating gap intervals as shown in FIG. 1. When applying the compressed mode, the mobile station sends data by temporarily increasing transmission power as shown in FIG. 1, in order to avoid transmission quality degradation. The time length of the gap intervals is settable at any length of 3 slots, 4 slots, 5 slots, 7 slots, 10 slots, and 14 slots, with respect to 10 ms (=15 slots) of a transmission frame of a physical channel (a dedicated CH), to which the compressed mode is applied.

Figure 2:
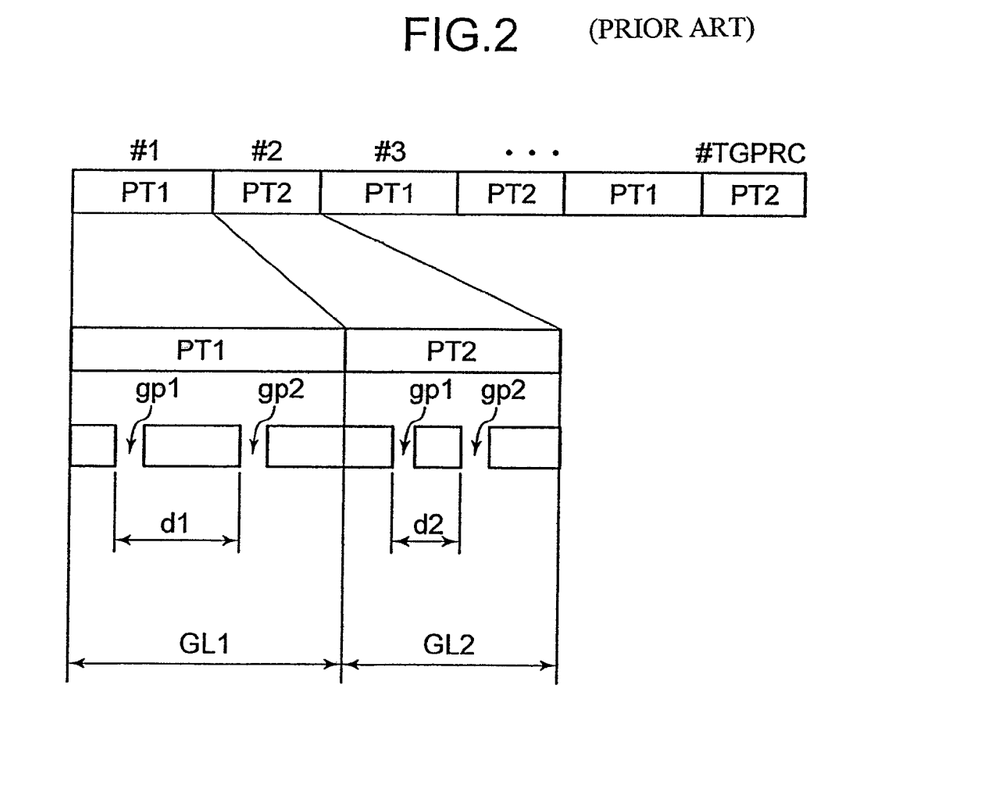
FIG. 2 is a diagram used for explanation of gap intervals at the time of the compressed mode.

Further, as shown in FIG. 2, transmission gap pattern PT1 and PT2 are specified in the compressed mode, respectively, and these patterns PT1 and PT2 are alternately repeated the number of transmission gap pattern repetition count (TG-PRC). Two gaps of gaps gp1 and gp2 can be created within the patterns PT1 and PT2, respectively. In the patterns PT1 and PT2, the interval lengths of the respective gaps gp1 and gp2, and distances d1 and d2 between the respective gaps gp1 and gp2 are specified in slot units. Gap lengths GL1 and GL2 are specified by the number of frames (10 ms), and are arranged to be as much as the length of 144 frames. The number of the TGPRCs is settable at as much as an infinite number. Accordingly, the mobile station, which is once designated so as to enter the compressed mode by the base station end, comes to keep creating gap intervals for the number of the TGPRCs periodically (infinitely if the TGPRC is set at an infinite number).

Figures 3A, 3B:
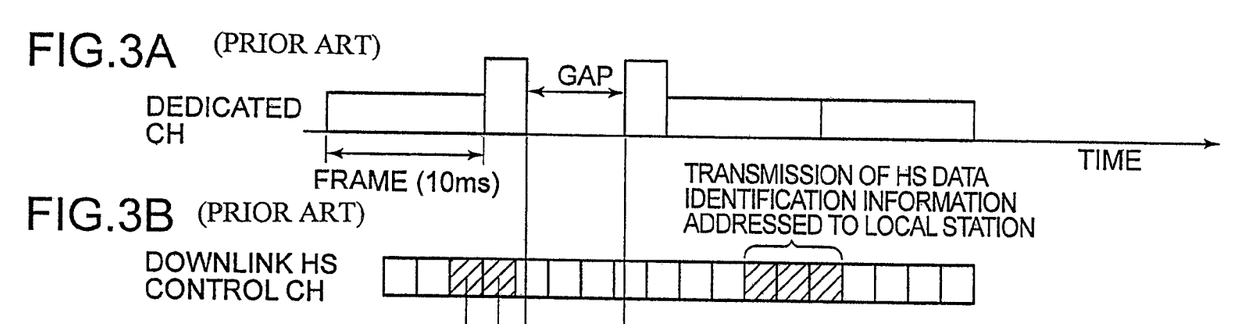
FIG. 3 is a diagram used for explanation of a relationship between gap intervals during the compressed mode and HS data CH non-assignable intervals.
Figures 3C, 3D:
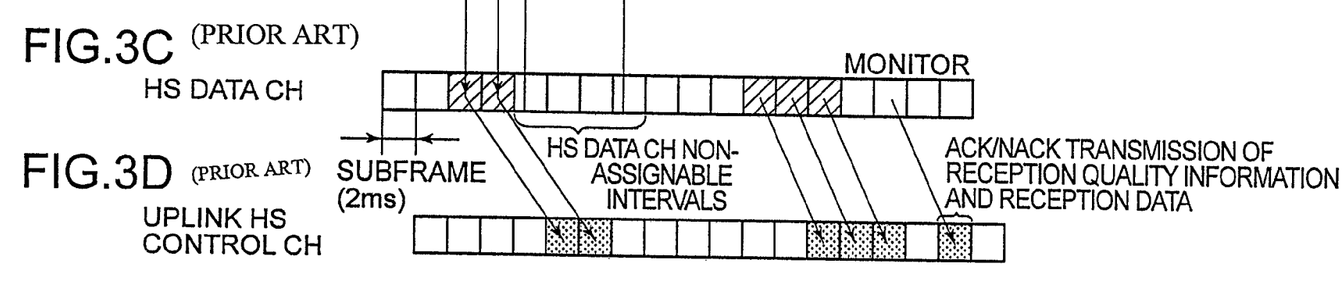

Meanwhile, as a method of rapidly improving data transmission rate in a mobile communication system, for example, 3GPP complementarily defines a high speed channel (hereinafter referred to as an "HS-CH") as an independent channel other than the dedicated CH in FIG. 3A, which is a physical channel to which the compressed mode is originally applied, as shown in FIG. 3. FIG. 3B shows a downlink HS control CH, FIG. 3C shows an HS data CH, and FIG. 3D shows an uplink HS control CH.

Referring to FIG. 3, the HS-CH is a channel over which time sharing data transmission is performed in a shorter cycle (a wireless frame of 2 ms that is called subframe) than a wireless frame (10 ms) of the dedicated CH to which the compressed mode is applied, and it is regarded as a channel that can be shared among a plurality of mobile stations. Under the HS-CH, the reception quality of the HS data CH is monitored on the mobile station end, as a function independent of the monitor function in the compressed mode. It is made possible to realize high speed data transmission service of best effort type by performing, over the uplink HS control CH, feedback transmission of the monitored reception quality information and either of an acknowledge (ACK) and a nonacknowledge (NACK), which are the reception judgment results of the above-mentioned reception data, from a mobile station to a base station. Although the HS-CH is a channel different from the dedicated CH, in a case where the compressed mode is applied to the dedicated CH so as to monitor different frequency base stations, data transmission with a base station becomes impossible even over the HS-CH. Therefore, no assignment of HS data CH is made in the HS-CH intervals corresponding to the gap intervals at which the different frequency base stations are monitored. In order to do such a matter, the base station end, before the gap intervals are created over the dedicated CH, instructs the mobile station end to stop the assignment of HS data, over the downlink HS control CH. On the receipt of this instruction, the mobile station end does not make the assignment of HS data to the HS data CH. Thereafter, on the termination of the gap intervals, namely on the termination of the monitor operation of the different frequency base stations, the base station end sends HS data identification information addressed to a mobile station. The mobile station, on the receipt of the HS data identification information addressed to a local station, monitors the reception quality of the HS data CH, and then performs feedback transmission of the reception quality information and an ACK or an NACK to the base station over the uplink HS control CH.

Figure 4:
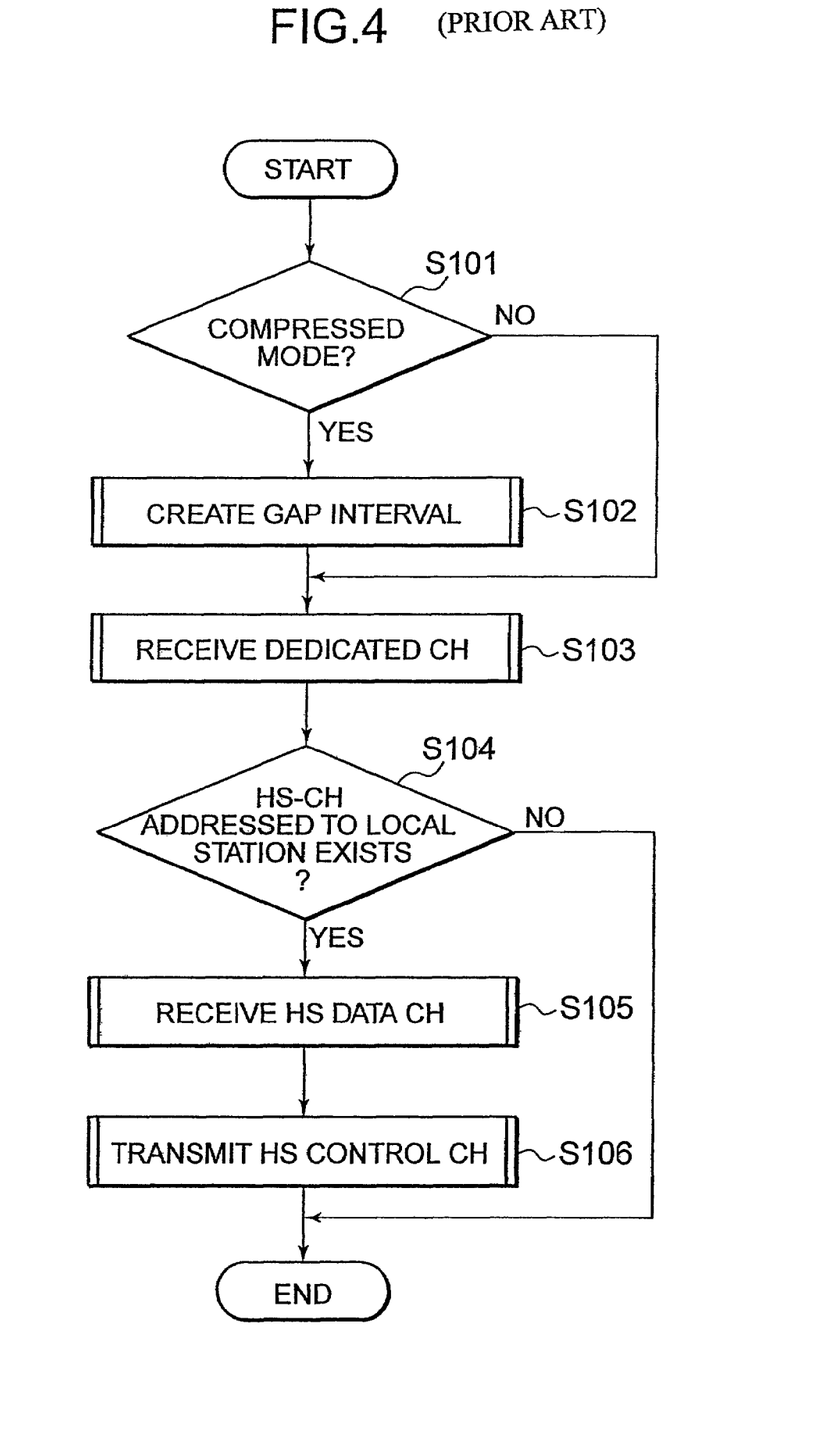
FIG. 4 is a flowchart of data transmission control operation based on presence or absence of application of the compressed mode and the HS-CH assignment, in a conventional mobile station.

FIG. 4 shows a flowchart of data transmission control operation on the mobile station end, based on the presence or absence of the application of the above-mentioned compressed mode and the HS-CH assignment.

Referring to FIG. 4, in step S101, a mobile station judges whether the compressed mode is applied from a base station end. The flow proceeds to the processing of step S103 if judged that the compressed mode is not applied, whereas proceeds to the processing of step S102 if judged that the compressed mode is applied. When advanced to the processing step S102, the mobile station creates gap intervals and monitors different frequency base stations, as described above. After the processing of step S102, the flow proceeds to step S103. When advanced to the processing of step S103, the mobile station starts data receiving over the dedicated CH.

Next, in the processing of step S104, the mobile station judges whether there is the HS-CH assignment addressed to a local station, over the downlink HS control CH. The processing is terminated when there is no HS-CH assignment addressed to the local station, whereas the flow proceeds to the processing of step S105 when there is the assignment. When advanced to the processing of step S105, the mobile station starts data receiving over the HS data CH and monitors reception quality. Further, the mobile station, in step S106, sends the base station the reception quality information during the data reception in step S105, and an ACK or an NACK, with use of the uplink HS control CH.

Figure 5:
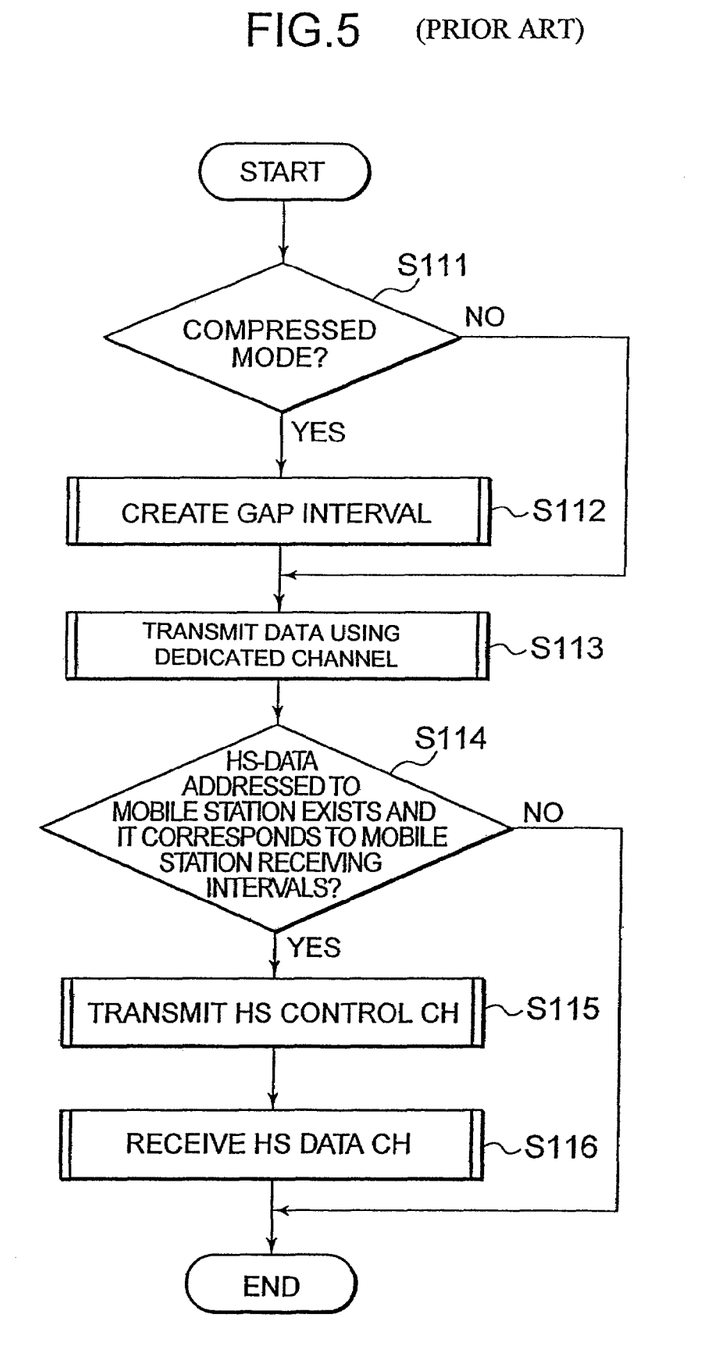
FIG. 5 is a flowchart of data transmission control operation based on the presence or absence of the application of the compressed mode and the HS-CH assignment, in a conventional base station.

FIG. 5 shows a flowchart of data transmission control operation on a base station, based on the presence or absence of the application of the above-mentioned compressed mode and the data with use of HS-CH.

Referring to FIG. 5, in step S111, the base station judges whether there is the application of the compressed mode to a mobile station currently in communication. The flow proceeds to the processing of step S113 if judged that there is no application of the compressed mode to this mobile station, whereas the flow proceeds to the processing of step S112 if there is the application of the compressed mode. When advanced to the processing of step S112, the base station creates gap intervals. After the processing of step S112, the flow proceeds to step S113. When advanced to the processing of step S113, the base station performs data transmission with use of the dedicated CH of this mobile station.

Next, in the processing of step S114, the base station judges whether there is HS data addressed to a mobile station and it corresponds to the receiving intervals of this mobile station. The processing is terminated if the judged that there is no HS data addressed to the mobile station or it does not correspond to the receiving intervals of this mobile station. On the other hand, if judged that there is the HS data addressed to the mobile station and it corresponds to the receiving intervals of the mobile station, the base station sends, as the processing of step S115, data identification information addressed to the mobile station over the downlink HS control CH, and then receives the HS data with the use of the HS data CH, in step S116.

For example, the following patent document 1 discloses a technique of utilizing the compressed mode in W-CDMA. In this patent document, a base station apparatus creates a transmission schedule so as to send packet data at the time other than the gap intervals at which no data is sent in the compressed mode. In accordance with the technique of this patent document, there is no fear of packet data from being sent at the time other than the time at which no data is sent in the compressed mode. This enables to reduce interference with a communication terminal apparatus and improve throughput.

Japanese Patent Laid-Open No. 2003-153339 (FIG. 1)

However, as described above, in the case where the above-mentioned compressed mode of the dedicated CH is set when performing high speed data transmission over the HS-CH, non-receivable intervals (non-assignable intervals) of HS data CH may occur as shown in FIG. 3. It follows that the downlink HS-CH transmission rate practically degrades. That is, the length of wireless frame of the dedicated CH is as much as 10 ms. In contrast, the length of a subframe of the HS-CH is defined to be only 2 ms. Therefore, when the compressed mode of the dedicated CH is applied at the time of high speed data transmission over the HS-CH, the mobile station may loose a valuable assignment of the HS-CH by the amount of the time corresponding to the above-mentioned gap intervals of the compressed mode. This makes it impossible to transmit data of several subframes thereby to substantially degrade the HS-CH transmission rate. In particular, even in the presence of a mobile station in a favorable reception quality area at which it is unnecessary to execute handover, for example, if the compressed mode is set and the lack of the HS-CH assignment occurs, there is the problem of making it impossible to realize high speed data transmission service that is the aim of the HS-CH.

SUMMARY OF THE INVENTION

Accordingly, the aim of the present invention is to provide a mobile terminal, a wireless relay apparatus, and a mobile communication system, which enable to prevent data transmission rate degradation in a channel for high speed data transmission service, when a mobile terminal exists in a favorable reception quality area.

A mobile terminal of the present invention has communication means for performing data communication per a fixed time length; mode setting information obtaining means for obtaining, via the communication means, predetermined mode setting information notified from a base station end; free time generation processing means for generating a free time at which no data communication is performed in a fixed time length and performing a predetermined processing in the free time, by compressing intervals at which data communication is performed in the fixed time length based on the predetermined mode setting information obtained by the mode setting information obtaining means; judging means for judging whether communication quality during data communication by the communication means is not less than a preset predetermined communication quality; and control means that, in a case where the predetermined mode setting information is obtained by the mode setting information obtaining means and data communication is performed by the communication means, controls the free time generation processing means to generate the free time and to perform the other predetermined processing in the free time and also controls the communication means to temporarily stop data communication, when the judging means judges that communication quality detected by the detecting means is under the predetermined communication quality, whereas controls the free time generation processing means not to generate the free time and not to perform the other predetermined processing, and also controls the communication means to continue performing data communication, when the judging means judges that communication quality detected by the detecting means is not less than the predetermined communication quality.

A wireless relay apparatus of the present invention has communication means for performing data communication per a fixed time length; notifying means for notifying, via the communication means, a mobile terminal of predetermined mode setting information; free time generation means for generating a free time at which no data communication is performed in the fixed time length, by compressing intervals at which data communication is performed in the fixed time length, when predetermined mode setting information is notified from the notifying means to a mobile terminal; judging means for judging, based on communication quality information sent from a mobile terminal currently in communication, whether communication quality with the mobile terminal is not less than a preset predetermined communication quality; and control means that, in a case where predetermined mode setting information is notified from the notifying means to a mobile terminal and data communication is performed by the communication means, controls generation of the free time processing means to generate the free time and also controls the communication means to temporarily stop data communication, when the judging means judges that the communication quality is under a predetermined communication quality, whereas controls the free time generation processing means not to generate the free time, and also controls the communication means to cause data communication to be continued, when the judging means judges that the communication quality is not less than the predetermined communication quality.

A mobile communication system of the present invention has a mobile terminal that, in a case where predetermined mode setting information notified from a wireless relay apparatus end is obtained and data communication is performed, judges whether communication quality during the data communication is not less than a preset predetermined communication quality, and generates a free time interval at which no data communication is performed in a fixed time length, and performs a predetermined processing in the free time, and also causes data communication to be stopped temporarily, by compressing intervals at which no data communication is performed in the fixed time length, when judged that communication quality during data communication is under a preset predetermined communication quality, whereas does not generate the free time and perform the other predetermined processing but continues performing data communication, when judged that communication quality during data communication is not less than a preset predetermined communication quality; and a wireless relay apparatus that, in a case where predetermined mode setting information is notified to the mobile terminal and data communication is performed, judges, based on communication quality information sent from the mobile terminal, whether communication quality with the mobile terminal is not less than a predetermined communication quality, and compresses intervals at which data communication is performed in a fixed time length, thereby to generate a free time interval at which no data communication is performed in the fixed time length, and also temporarily stops data communication, when judged that communication quality at the mobile terminal is under a preset predetermined communication quality, whereas does not generate the free time but continues performing data communication, when judged that communication quality at the mobile terminal is not less than a preset predetermined communication quality.

In the present invention, even when predetermined mode setting information is notified, if the communication quality during data communication is not less than a preset predetermined communication quality, the mobile terminal and the wireless relay apparatus do not generate a free time at which no data communication is performed in a certain communication unit time, but continues performing data communication.

In accordance with the present invention, even if predetermined mode setting information is notified, when the communication quality during data communication is not less than a preset predetermined communication quality, it is configured such that the mobile terminal and the wireless relay apparatus do not generate a free time at which no data communication is performed in a certain communication unit time, but continues performing data communication. Therefore, in the presence of a mobile terminal in a favorable reception quality area, it is able to prevent data transmission rate degradation in a channel for high speed data transmission service, for example.

DESCRIPTION OF PREFERRED EMBODIMENTS

One preferred embodiment of the present invention will be described below by referring to the drawings.

In the preferred embodiment of the present invention, a mobile communication system, a mobile terminal (mobile station), and a wireless relay apparatus (base station) of the present invention are now described by taking, as example, high speed downlink packet access (HSDPA) system in R5 (release 5) of 3GPP, which is a standardization project of the third generation mobile phone system.

Figure 6:
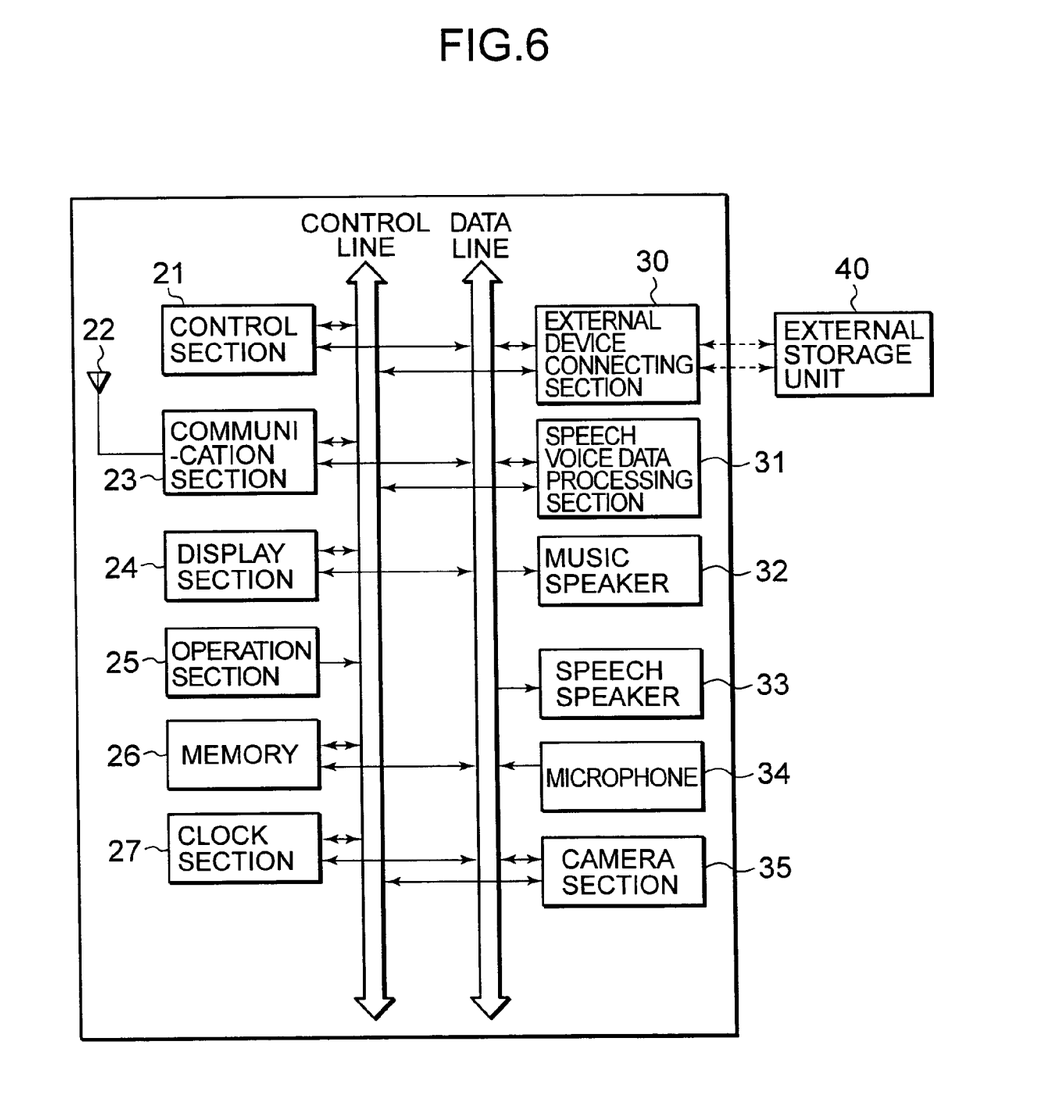
FIG. 6 is a block diagram showing major sections of an internal circuit configuration of a mobile telephone terminal in one preferred embodiment of the present invention.

FIG. 6 shows circuit configurations of the inside of a mobile phone terminal that is an example of mobile stations constituting a mobile communication system of the present invention. The respective circuit configurations shown in FIG. 6 illustrate the only major ones.

In FIG. 6, an antenna 22 is a whip antenna or an internally stored antenna, and performs transmission/reception of signal waves.

A communication section 23 performs frequency conversion of sending and receiving signals, modulation and demodulation, spread spectrum and dispreading, discrimination whether the sent and received data is speech voice data or other data, creation of various gap intervals at the time of compressed mode, change of spreading factor, change of transmission power, and level detection for monitoring the reception quality over the HS-CH. Here, the data other than speech voice data are image data and electronic mail, various data downloaded by utilizing the Internet access function, and various program data. The data other than the received speech voice data (packet data etc.) are sent and stored, via a data line, to a memory 26 that is an internal memory.

The received speech voice data is sent to a speech voice data processing section 31 via the data line. The speech voice data processing section 31 decodes the voice data and sends the decoded voice data to a speech speaker (reception speaker) 33 via the data line. The speech speaker 33, which includes a digital/analog converter and an amplifier, subjects voice data to digital/analog conversion and amplification, and then outputs speech voice. On the other hand, a speech voice signal inputted via a transmission microphone 34 is converted to digital voice data by the analog/digital converter contained in the transmission microphone 34, and then sent to the communication section 23 via the data line.

A display section 24, which is composed of, for example, a liquid crystal display panel or an electroluminescence (EL) display panel and a driving circuit thereof, displays image and electronic mail sentences on a screen.

An operation section 25 is provided with, for example, a plurality of keys such as numeric keypad of "0" to "9", a power key, a call-reception key, a screen cursor operation key, and a function key, and various operators such as jog dial. An operation signal, which the operation section 25 generates in response to a user's operation, is sent to a control section 21.

The memory 26 is composed of a read only memory (ROM) and a random access memory (RAM). The ROM stores a control program and various initial values, based on which the control section 21 controls respective sections, a program for performing screen display on the display section 24, the telephone number of the portable telephone terminal, and font data. This ROM includes a rewritable ROM such as electrically erasable and programmable read only memory (EEPROM), thereby making it possible to also retain data such as data of electronic mail and the like to be sent and received, a telephone directory and electronic mail addresses to be set by user, various downloaded data, and user setting other values. The RAM is used as a work area when the control section 21 performs processing of various data, and an area for temporarily accumulating image data to be displayed on the display section 24.

A clock section 27 generates the current time information, time count, and synchronization information for frame synchronization.

An external device connecting section 30 is an interface for connecting an external storage unit 40 such as an external memory (exterior type memory), and a mobile phone terminal. The mobile phone terminal of this preferred embodiment is also able to send, as needed, various data such as a telephone book, electronic mail addresses, electronic mail data, jotter data, and data downloaded by using the Internet access function, to the external storage unit 40 via the external device connecting section 30, and have the various data to be stored there.

A music speaker 32 is a speaker for outputting musical sound when a musical data is regenerated, and a ringtone, and includes a digital/analog converter and an amplifier, as in the speech speaker 33.

A camera section 35, which includes an optical lens and an image pickup device, is a component for implementing digital camera function. Photo data taken by the camera section 35 is stored in the memory 26 and the external storage unit 40.

The control section 21 is composed of, for example, a central processing unit (CPU), and performs via a control line the control of respective components of the portable telephone terminal and various operation processing. The control section 21 also performs various controls such as the control of creation of gap intervals at the time of the compressed mode, the control of monitor of different frequency base stations within the gap intervals, handover control, the generation of reception quality information at the HS-CH, the feedback transmission control of hybrid automatic repeat request (HARQ) ACK/NACK in R5 of 3GPP.

Figure 7:
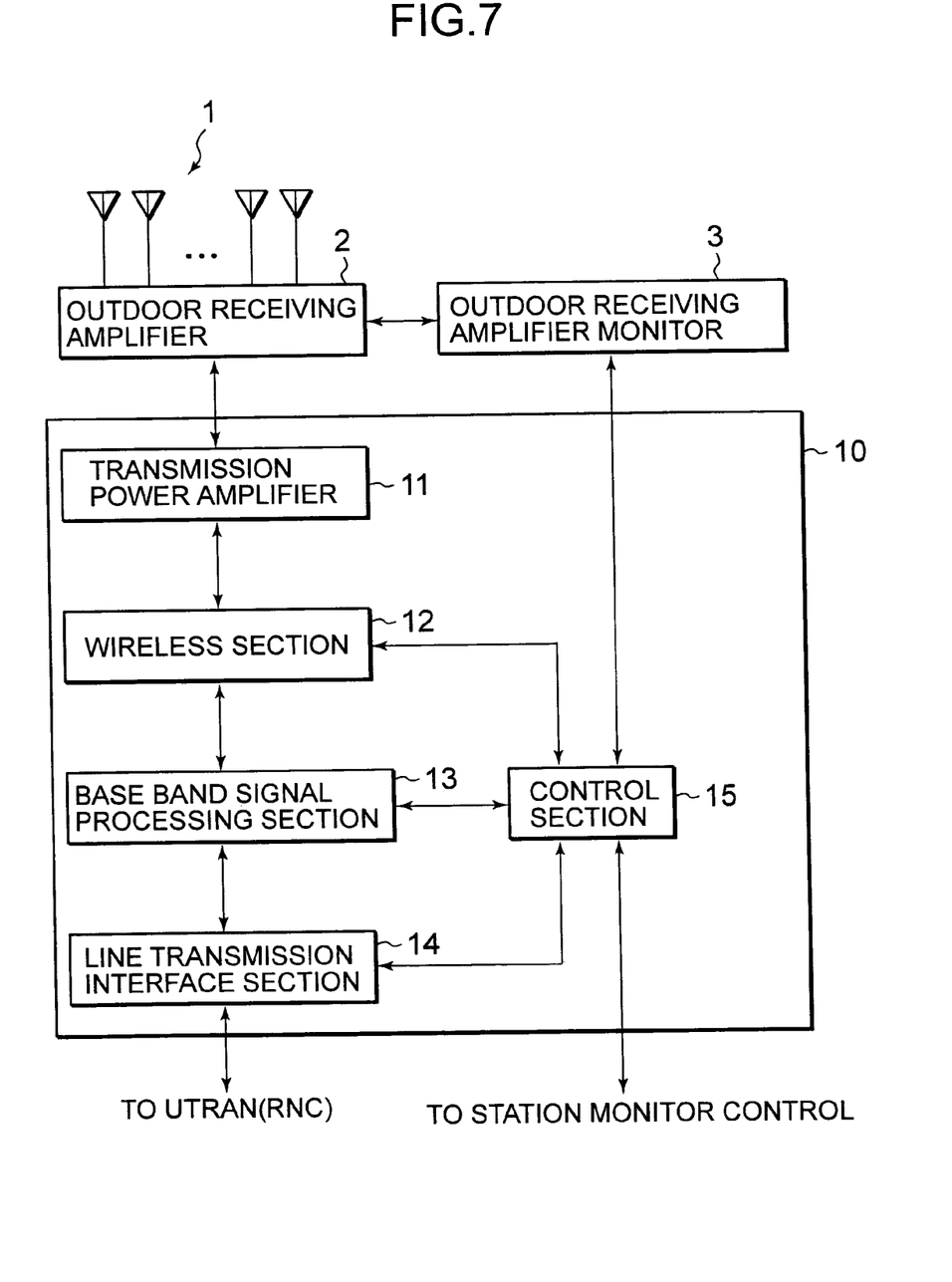
FIG. 7 is a block diagram showing major sections of an internal circuit configuration of a base station in this preferred embodiment.

FIG. 7 shows an example of the configuration of a base station constituting a mobile communication system of the present invention.

In FIG. 7, the base station of this preferred embodiment is composed of a plurality of antennas 1 for enabling diversity receiving, an outdoor receiving amplifier 2 for amplifying signals received by the antennas 1, an outdoor receiving amplifier monitor 3 for monitoring the operation of the outdoor receiving amplifier 2, and a base station main body 10.

A transmission power amplifying section 11, a wireless section 12, a base band signal processing section 13, a line transmission path interface section 14, and a control section 15 are disposed in the base station main body 10.

The line transmission path interface section 14 is an interface between a base station control unit and the base station, and has an asynchronous transfer mode (ATM) processing function, an ATM adaptation layer (AAL) signal processing function, and a service specific connection oriented protocol (SSCOP) function.

The base band signal processing section 13 subjects a transmission signal, which is supplied via the line transmission interface section 14, to respective processing of error correction coding, framing, and data modulation, spreading modulation, and then transmits it to the wireless section 12. It also subjects a reception signal, which is received by the antennas 1 and supplied via the wireless section 12, to signal processing such as dispreading, chip synchronization, error correction decoding, data multiplexing/separation, and maximum ratio combining at the time of inter-sector diversity handover.

The wireless section 12 performs digital/analog conversion of a transmission signal, which is generated by spreading a base band signal, and converts it to a wireless frequency signal by orthogonal transformation, and then transmits it to the transmission power amplifying section 11. It also performs quasi-synchronous detection and analog/digital conversion of a reception signal, which is received by the antennas 1 and supplied via the outdoor receiving amplifier and the like, and then transmits it to the base band signal processing section 13. The wireless section 12 also performs creation of various gap intervals at the time of the compressed mode.

The transmission power amplifying section 11 subjects a transmission signal from the wireless section 12 to power amplification up to a required antenna input level.

The control section 15 performs the transmission and reception of a call control signal, which is performed with the base station control unit, the wireless line management, the control of wireless line setting/release, the control of creation of gap intervals at the time of the compressed mode, and various controls to be described later, based on the reception quality information of the HS-CH sent from the mobile phone terminal end, and a feedback ACK/NACK.

Here, this preferred embodiment uses high speed-downlink shared channel (HS-DSCH), as a downlink HS-CH for realizing high speed data transmission service in 3GPP regulation, and uses high speed-dedicated physical data channel (HS-DPCCH), as an uplink HS control CH. Unlike the dedicated CH, the HS-DSCH is a physical channel that can be shared among a plurality of mobile phone terminals, and data transmission is performed by using a subframe of 2 ms. Although the HS-DSCH is a shared channel, if other mobile phone terminal is not used, the base station can continuously assign a subframe to a specific mobile phone terminal. Thereby, high speed downlink communication system by using the HS-DSCH is realizable in 3GPP. The HS-DPCCH is an uplink control information channel corresponding to a downlink HS-DSCH, and information is sent from the portable telephone terminal in subframe units, as in the HS-DSCH. Examples of control information to be transmitted by using the HS-DPCCH are reception quality information that is called channel quality indicator (hereinafter referred to as "CQI"), and HARQ ACK and NACK. A mobile phone terminal continuously sends a CQI value to the HS-DPCCH. Therefore the base station grasps the reception quality state of the mobile phone terminal by the CQI value reported from the mobile phone terminal, and the data transmission of the HS-DSCH can be made efficient by changing modulation system and transmission format, depending on the CQI value. In addition, the base station is able to judge whether data transmission processing over the HS-DSCH should be performed or not, on the basis of an ACK (or an NACK) reported from the mobile phone terminal.

Even in a case where there is applied the compressed mode in which gap intervals are created in the above-mentioned receiving intervals, for example, when the mobile phone terminal and the base station are able to judge that reception quality is favorable, arrangements can be made so as not to create gap intervals, thereby to have the above-mentioned non-assignable intervals not to be created in the HS-DSCH, thus allowing for continuous high speed data transmission over the HS-DSCH. Thus, this preferred embodiment avoids degradation of the transmission rate of the HS-DSCH that is originally high speed. Of course, in accordance with this preferred embodiment, gap intervals are not created if reception quality is favorable at the time of the compressed mode, and therefore, data transmission rate can be maintained even in the dedicated CH, as in the transmission rate of the HS-DSCH.

Figure 8:
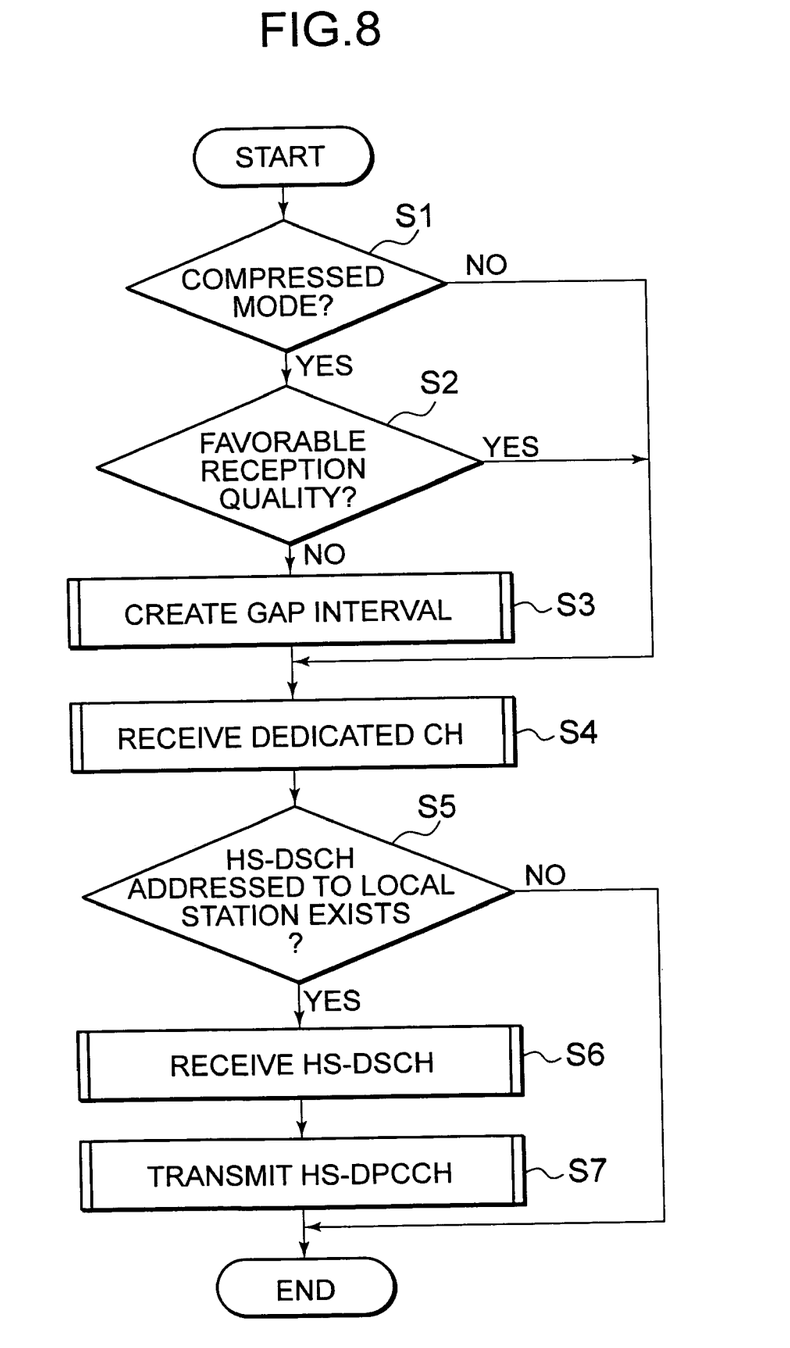
FIG. 8 is a flowchart of data transmission control operation based on the presence or absence of the application of the compressed mode and the HS-CH assignment, in a portable telephone terminal of this preferred embodiment.

FIG. 8 shows a flowchart of data transmission control operation based on the presence or absence of the above-mentioned compressed mode application and the HS-CH assignment, on the portable telephone terminal end of this preferred embodiment.

Referring to FIG. 8, in step S1, the control section 21 of the portable telephone terminal judges whether the compressed mode is applied from the base station end. If judged that the compressed mode is not applied, the flow proceeds to step S4. If judged that the compressed mode is applied, the flow proceeds to step S2. When advanced to the processing of step S2 after judging in step S1 that the compressed mode is applied, the control section 21 determines whether the continuously measured CQI value is not less than a predetermined value that is preset as a favorable value, thereby judging whether reception quality is favorable or not. If judged that the reception quality is favorable, the flow proceeds to step S4. If judged that the reception quality is not favorable, the flow proceeds to step S3. Here, assume that the above-mentioned predetermined value of the CQI value is predetermined on the base station end of this preferred embodiment, and notified from the base station to the mobile phone terminal of this preferred embodiment by means of signaling or the like.

When advanced to the processing of step S3, the control section 21 controls the communication section 23 thereby to create gap intervals as described above, and monitor base stations having different frequencies within the gap interval. After the processing of step S3, the flow proceeds to step S4. When advanced to the processing of step S4, the mobile phone terminal starts data receiving over the dedicated CH.

Specifically, when the compressed mode is applied, the mobile phone terminal of this preferred embodiment creates gap intervals in the processing of step S3, and monitors different frequency base stations for the purpose of handover in the gap intervals, if judged in step S2 that the reception quality is not favorable. On the other hand, even when the compressed mode is applied, the mobile phone terminal of this preferred embodiment does not create gap intervals by passing the processing of step S3, if judged in step S2 that the reception quality is favorable, that is, if judged that the local station exists in a favorable reception quality area requiring no handover.

Next, in the processing of step S5, the control section 21 judges whether there is the HS-DSCH assignment addressed to a local station, over the downlink HS-DPCCH. The processing is terminated in the absence of the HS-DSCH assignment addressed to the local station, whereas the flow proceeds to step S6 in the presence of the assignment. When advanced to the processing of step S6, the control section 21 controls the communication section 23 so as to start reception of HS data over the HS-DSCH, and monitors the reception quality obtained from the communication section 23. Further, the control section 21, in step S7, controls the communication section 23 so as to send the base station end the reception quality information during the data reception in step S6, and an ACK or an NACK, over the uplink HS-DPCCH.

Figure 9:
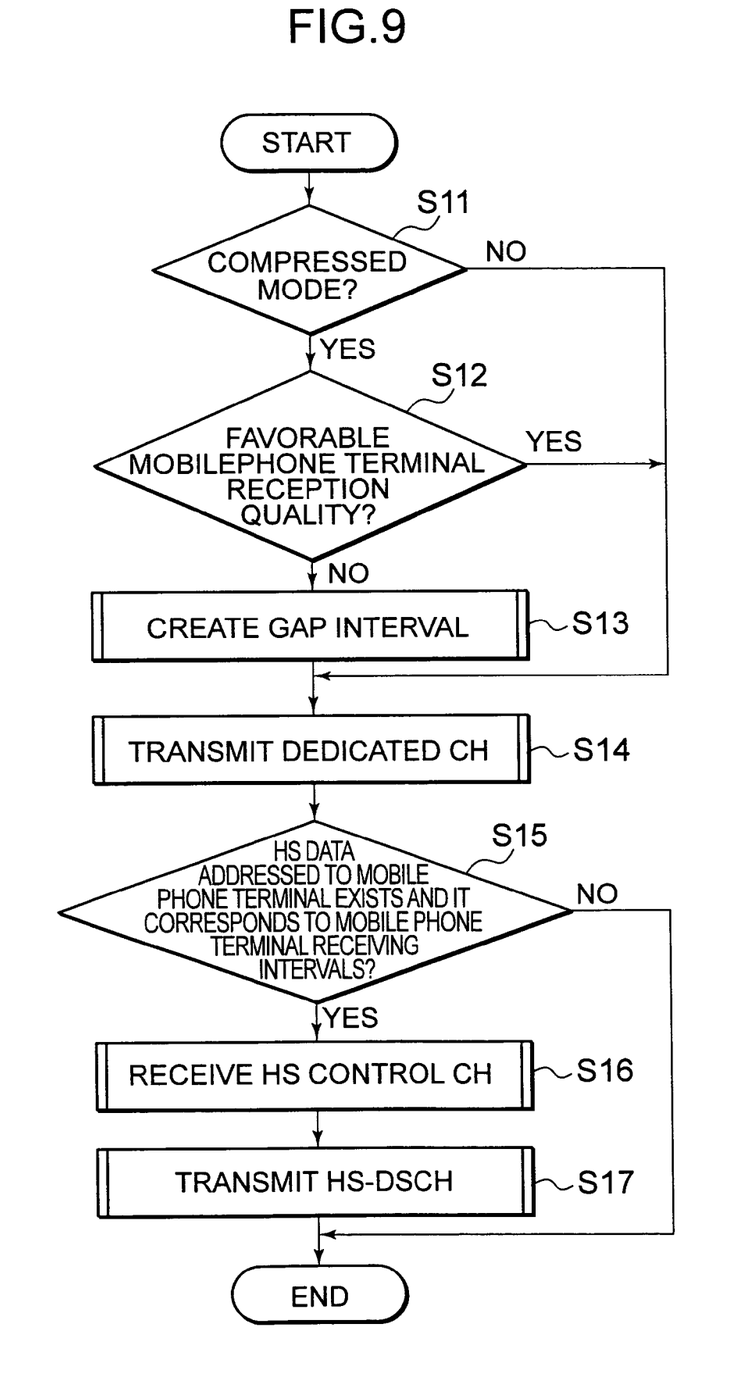
FIG. 9 is a flowchart of data transmission control operation based on the presence or absence of the application of the compressed mode and the HS-CH assignment, in a base station of this preferred embodiment.

FIG. 9 shows a flowchart of data transmission control operation on the base station end, on the basis of the presence or absence of the application of the above-mentioned compressed mode and the data over the HS-CH.

Referring to FIG. 9, in step S11, the control section 15 of the base station judges whether there is the application of the compressed mode to a mobile station currently in communication. The flow proceeds to step S14 if judged that there is no application of the compressed mode to this mobile station, whereas the flow proceeds to step S12 if judged that there is the application of the compressed mode. When advanced to the processing of step S12 after judging in step S11 that there is the application of the compressed mode, the control section 15 determines whether the CQI value notified from the mobile phone terminal end is not less than a predetermined value that is preset as a favorable value, thereby judging whether reception quality is favorable or not. If judged that the reception quality is favorable, the flow proceeds to step S14. If judged that the reception quality is not favorable, the flow proceeds to step S13. Here, the above-mentioned predetermined value of the CQI value is predetermined on the base station end of this preferred embodiment.

When advanced to the processing of step S13, the control section 15 controls the wireless section 12 to create of gap intervals as described above. After the processing of step S13, the flow proceeds to step S14. When advanced to the processing of step S14, the base station starts data sending over the dedicated CH.

Specifically, the base station of this preferred embodiment, when applying the compressed mode, creates gap intervals in the processing of step S13, if judged in step S12 that the reception quality is not favorable. On the other hand, the base station of this preferred embodiment, even when applying the compressed mode, does not create gap intervals by passing the processing of step S13, if judged in step S12 that the reception quality is favorable, that is, if judged that a portable telephone terminal exists in a favorable reception quality area requiring no handover.

Next, in the processing of step S15, the control section 15 judges whether there is HS data addressed to a mobile phone terminal and it corresponds to receiving intervals of the mobile phone terminal. The processing is terminated if judged that there is no HS data addressed to the mobile phone terminal or it does not correspond to the receiving intervals of the mobile phone terminal. On the other hand, if judged that there is the HS data addressed to the mobile phone terminal and it corresponds to the receiving intervals of the mobile phone terminal, the control section 15 controls, in step S16, the wireless station 12 so as to send data identification information addressed to the mobile phone terminal over the downlink HS control CH, and then sends HS data over the HS-DSCH in step S17.

As described above, in accordance with this preferred embodiment, even if the compressed mode is applied, no gap intervals are created when reception quality is favorable, thus eliminating the possibility that non-assignable intervals will exist in the HS-DSCH. As a result, as long as there is transmission data to a mobile phone terminal, the base station is able to perform scheduling of the HS-DSCH subframe to the mobile phone terminal, so that the mobile phone terminal is able to continuously receive data over the HS-DSCH, and also continuously send an ACK or an NACK over the HS-DPCCH. Hence, the mobile phone system of this preferred embodiment is able to prevent degradation of the data transmission capability of the HS-DSCH. This enables to fully achieve the high speed data transmission capability of the HS-DSCH, thereby to realize high speed data transmission service.

The description of the foregoing preferred embodiment is one example of the present invention. Therefore, the present invention should not be limited to the foregoing preferred embodiment, but various modifications are of course possible, depending on the design and the like, without departing from the technical idea of the present invention. The mobile terminal of this preferred embodiment is not limited to mobile phone terminals, but may be various devices such as PDAs with communication function, notebook-sized personal computers, and digital TV receivers that are portable and provided with communication function.

What is claimed is:

1. A mobile terminal comprising:
communication means for performing data communication per a fixed time length to a base station end, wherein communication means has at least two channels including a first channel that communicates for said fixed time length and a second channel that communicates for fractional parts of said fixed time length;
mode setting information obtaining means for obtaining predetermined mode setting information notified from said base station end, wherein the predetermined mode is a mode that the mobile terminal is monitoring of neighboring base stations other than a current communication base station end;
free time generation processing means for generating a free time interval at which no data communication is performed in said fixed time length and performing a predetermined processing in the free time interval, by compressing intervals at which data communication is performed in said fixed time length, when said predetermined mode setting information obtained by said mode setting information obtaining means from the base station end;
judging means for judging whether communication quality of the second channel between the mobile terminal and the base station end by said communication means is not less than a preset predetermined communication quality of the second channel between the mobile terminal and the base station end; and
control means, when said judging means judges that the communication quality of the second channel between the mobile terminal and the base station end is under the predetermined communication quality of the second channel between the mobile terminal and the base station end, for controlling said free time generation processing means to generate the free time interval and for controlling said communication means to temporarily stop data communication during the free time interval, and
when said judging means judges that the communication quality of the second channel between the mobile terminal and the base station end is not less than the predetermined communication quality of the second channel between the mobile terminal and the base station end, for controlling said free time generation processing means not to generate the free time interval and also for controlling said communication means to continue performing data communication,
wherein the free time intervals are not generated when communication quality is not less than the preset predetermined communication quality of the second channel between the mobile terminal and the base station end.

2. The mobile terminal according to claim 1, wherein said free time generation processing means generates the free time interval at which no data communication is performed in said fixed time length by increasing a transmission rate with regard to a fixed amount data communicated within said fixed time length.

3. A wireless relay apparatus comprising:
communication means for performing data communication per a fixed time length to a base station end, wherein communication means has at least two channels including a first channel that communicates for said fixed time length and a second channel that communicates for fractional parts of said fixed time length;
notifying means for notifying a mobile terminal of predetermined mode setting information from said base station end, wherein the predetermined mode is a mode that the mobile terminal is monitoring of neighboring base stations other than a current communication base station end;
free time generation means for generating a free time interval at which no data communication is performed in said fixed time length, by compressing intervals at which data communication is performed in said fixed time length, when said predetermined mode setting information is notified from said notifying means to a mobile terminal from the base station end;
judging means for judging, on the basis of communication quality information sent from a mobile terminal currently in communication with the base station end, whether communication quality of the second channel between said mobile terminal and the base station end is not less than a preset predetermined communication quality of the second channel; and control means, when said judging means judges that the communication quality of the second channel between the mobile terminal and the base station end is under the predetermined communication quality of the second channel between the mobile terminal and the a base station end, causes said free time generation means to generate the free time interval and also controls said communication means to temporarily stop data communication during the free time interval, and when said judging means judges that the communication quality of the second channel between the mobile terminal and the base station end is not less than the predetermined communication quality of the second channel between the mobile terminal and the base station end, for controlling said free time generation processing means not to generate the free time interval, and for controlling said communication means to continue performing data communication, wherein the free time intervals are not generated when communication quality is not less than the preset predetermined communication quality of the second channel between the mobile terminal and the base station end.

4. The wireless relay apparatus according to claim 3, wherein said free time generation means generates the free time interval at which no data communication is performed in said fixed time length by increasing a transmission rate with regard to a fixed amount data communicated within said fixed time length.

5. A mobile communication system comprising:

a mobile terminal that, in a case where predetermined mode setting information notified from a wireless relay apparatus end is obtained and data communication is performed, wherein data communication has at least two channels including a first channel that communicates for a fixed time length and a second channel that communicates for fractional parts of said fixed time length, judges whether communication quality of the second channel during the data communication is not less than a preset predetermined communication quality of the second channel, and generates a free time interval at which no data communication is performed in a fixed time length, and performs a predetermined processing in the free time interval, and also causes data communication to be stopped temporarily, by compressing intervals at which no data communication is performed in said fixed time length, when judged that communication quality of the second channel during data communication is under a preset predetermined communication quality of the second channel, wherein the mobile unit does not generate the free time interval and continues performing data communication, when judged that the communication quality of the second channel during the data communication is not less than a preset predetermined communication quality of the second channel; and a wireless relay apparatus that, in a case where predetermined mode setting information is notified to said mobile terminal and the data communication is performed, judges, on the basis of communication quality information sent from said mobile terminal, whether communication quality of the second channel with said mobile terminal is not less than a predetermined communication quality of the second channel, and compresses intervals at which data communication is performed in a fixed time length, thereby to generate a free time interval at which no data communication is performed in said fixed time length, and also temporarily stops data communication, when judged that communication quality at said mobile terminal is under a preset predetermined communication quality of the second channel, wherein the wireless relay apparatus does not generate the free time interval but continues performing data communication, when judged that communication quality at the mobile terminal is not less than a preset predetermined communication quality of the second channel, wherein the predetermined mode is a mode that the mobile terminal is monitoring of neighboring base stations other than a current communication base station end, wherein the free time intervals are not generated when communication quality is not less than the preset predetermined communication quality of the second channel between the mobile terminal and the base station end.

6. The mobile communication system according to claim 5, wherein said mobile terminal generates the free time interval at which no data communication is performed in said fixed time length by increasing a transmission rate with regard to a fixed amount data communicated within said fixed time length.

7. A method of data communication by a mobile terminal comprising:

performing data communication for a fixed time length, wherein data communication has at least two channels including a first channel that communicates for said fixed time length and a second channel that communicates for fractional parts of said fixed time length;

obtaining predetermined mode setting information notified from a base station end, wherein the predetermined mode is a mode that the mobile terminal is monitoring of neighboring base stations other than a current communication base station end;

judging whether communication quality of the second channel during data communication is not less than a preset predetermined communication quality of the second channel; and generating a free time interval and temporarily stopping data communication when the communication quality of the second channel is under the predetermined communication quality of the second channel, and not generating the free time interval but continuing to perform data communication when the communication quality of the second channel is not less than the predetermined communication quality of the second channel, wherein the free time interval is an interval in which no data communication is performed in said fixed time length and in which predetermined processing is performed, by compressing intervals at which data communication is performed in said fixed time length based on said predetermined mode setting information, wherein the free time intervals are not generated when communication quality is not less than the preset predetermined communication quality of the second channel between the mobile terminal and the base station end.

* * * * *